US012613935B2

(12) United States Patent
Yang et al.

(10) Patent No.:  US 12,613,935 B2
(45) Date of Patent:       Apr. 28, 2026

(54) REINFORCEMENT LEARNING DEVICE AND OPERATION METHOD THEREOF

(71) Applicants: SK hynix Inc., Icheon (KR); Korea Advanced Institute of Science and Technology, Daejeon (KR)

(72) Inventors: Je Yang, Goyang (KR); Seongmin Hong, Daejeon (KR); Joo-Young Kim, Daejeon (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 1008 days.

(21) Appl. No.: 17/825,911

(22) Filed: May 26, 2022

(65) Prior Publication Data

US 2022/0405642 A1      Dec. 22, 2022

(30) Foreign Application Priority Data

Jun. 18, 2021     (KR) ........................ 10-2021-0079072

(51) Int. Cl.
*G06F 17/16*          (2006.01)
*G06F 7/544*          (2006.01)
(52) U.S. Cl.
CPC ............ *G06F 17/16* (2013.01); *G06F 7/5443* (2013.01)
(58) Field of Classification Search
CPC .................. G06F 17/16; G06F 7/5443; G06F 2207/3816; G06F 2207/382; G06N 3/0492; G06N 3/063; G06N 3/084; G06N 3/092; G06N 3/006; G06N 3/08
See application file for complete search history.

(56) References Cited

U.S. PATENT DOCUMENTS

| | | |
|---|---|---|
| 2015/0100530 A1 | 4/2015 | Mnih et al. |
| 2018/0285736 A1 | 10/2018 | Baum et al. |
| 2019/0303749 A1* | 10/2019 | Appuswamy ........... G06F 17/16 |
| 2020/0082269 A1* | 3/2020 | Gao ........................ G06F 7/483 |
| 2021/0357732 A1* | 11/2021 | Nez ....................... G06F 17/153 |
| 2022/0358749 A1* | 11/2022 | Yonetani ................. G06N 3/08 |
| 2023/0232080 A1* | 7/2023 | Kim ....................... G06F 1/3212 |
| | | 382/155 |

FOREIGN PATENT DOCUMENTS

KR      20190130443 A      11/2019

OTHER PUBLICATIONS

Yang et al. in "FIXAR: A Fixed-Point Deep Reinforcement Learning Platform with Quantization-Aware Training and Adaptive Parallelism", Feb. 2021, arXiv:2102.12103v1 (Year: 2021).*
V. Mnih et al., "Playing atari with deep reinforcement learning," arXiv preprint arXiv:1312.5602, 2013.

(Continued)

*Primary Examiner* — Carlo Waje

(57) ABSTRACT

A reinforcement learning device includes a computation circuit configured to perform an operation between a weight matrix and an input activation vector and to apply an activation function on an output of the operation to generate an output activation vector. The computation circuit quantizes the input activation vector when a quantization delay time has elapsed since beginning of a learning operation and does not quantize the input activation vector otherwise.

9 Claims, 7 Drawing Sheets

(56) References Cited

OTHER PUBLICATIONS

V. Mnih et al., "Asynchronous methods for deep reinforcement learning," International conference on machine learning, 2016, pp. 1928-1937.

T. P. Lillicrap et al., "Continuous control with deep reinforcement learning," arXiv preprint arXiv:1509.02971, 2015.

J. Schulman et al., "Proximal policy optimization algorithms," CoRR, vol. abs/1707.06347, Aug. 2017. Available: http:/arxiv.org/abs/1707.06347.

M. Kempka et al., "Vizdoom: A doom-based ai research platform for visual reinforcement learning," IEEE Xplore, 2016.

F. Farahnakian et al., "Energy-efficient virtual machines consolidation in cloud data centers using reinforcement earning," 2014 22nd Euromicro International Conference on Parallel, Distributed, and Network-Based Processing, 2014, pp. 500-507.

F. Zhang et al., "Towards vision-based deep reinforcement learning for robotic motion control," arXiv preprint, arXiv:1511.03791v2, Nov. 13, 2015.

S. Han et al., "Deep compression: Compressing deep neural networks with pruning, trained quantization and huffman coding," ICLR 2016, arXiv preprint arXiv:1510.00149, Feb. 15, 2016.

S. Zhou et al., "Dorefa-Net: Training low bitwidth convolutional neural networks with low bitwidth gradients," arXiv preprint arXiv:1606.06160, 2016.

J. Yang et al., "Quantization networks," Proceedings of the IEEE Conference on Computer Vision and Pattern Recognition, 2019, pp. 7308-7316.

B. Jacob et al., "Quantization and training of neural networks for efficient integer-arithmetic-only inference," Proceedings of the IEEE Conference on Computer Vision and Pattern Recognition, 2018, pp. 2704-2713.

S. Krishnan, "Quantization for Sustainable reinforcement learning," arXiv preprint arXiv:1910.01055, Nov. 28, 2019.

G. Barth-Maron, "Distributed distributional deterministic policy gradients," arXiv preprint arXiv:1804.08617v1, 2018.

S. Fujimoto, "Addressing function approximation error in actor-critic methods," Proceedings of the 35th International Conference on Machine Learning, 2018.

S. Jain, "Compensated-DNN: energy efficient low-precision deep neural networks by compensating quantization errors," 2018 55th ACM/ESDA/IEEE Design Automation Conference (DAC). IEEE, 2018, pp. 1-6.

X. Zhang et al., "Fixed-Point Back-Propagation Training," in Proceedings of the IEEE/CVF Conference on Computer Vision and Pattern Recognition, 2020, pp. 2330-2338.

E. Todorov et al., "MuJoCo: A physics engine for model-based control," 2012 IEEE/RSJ International Conference on Intelligent Robots and Systems, 2012, pp. 5026-5033.

J. Su et al., "Neural network based reinforcement learning acceleration on FPGA platforms," ACM SIGARCH Computer Architecture News, vol. 44, pp. 68-73, 2016.

H. Cho et al., "FA3C: FPGA-Accelerated deep reinforcement learning," Proceedings of the Twenty-Fourth International Conference on Architectural Support for Programming Languages and Operating Systems, 2019, pp. 499-513.

Y. Meng et al., "Accelerating proximal policy optimization on cpu-fpga heterogeneous platforms," 2020 IEEE 28th Annual International Symposium on Field-Programmable Custom Computing Machines (FCCM), 2020, pp. 19-27.

Srivatsan Krishnan et al., "Quantized Reinforcement Learning (QUARL)," arXiv:1910.01055v3 [cs.LG], Dec. 7, 2019.

Changhyeon Kim et al., "An Energy-Efficient Deep Reinforcement Learning Accelerator With Transposable PE Array and Experience Compression," IEEE Solid-State Circuits Letters, Nov. 2019.

* cited by examiner

<Prior Art>

FIG. 5

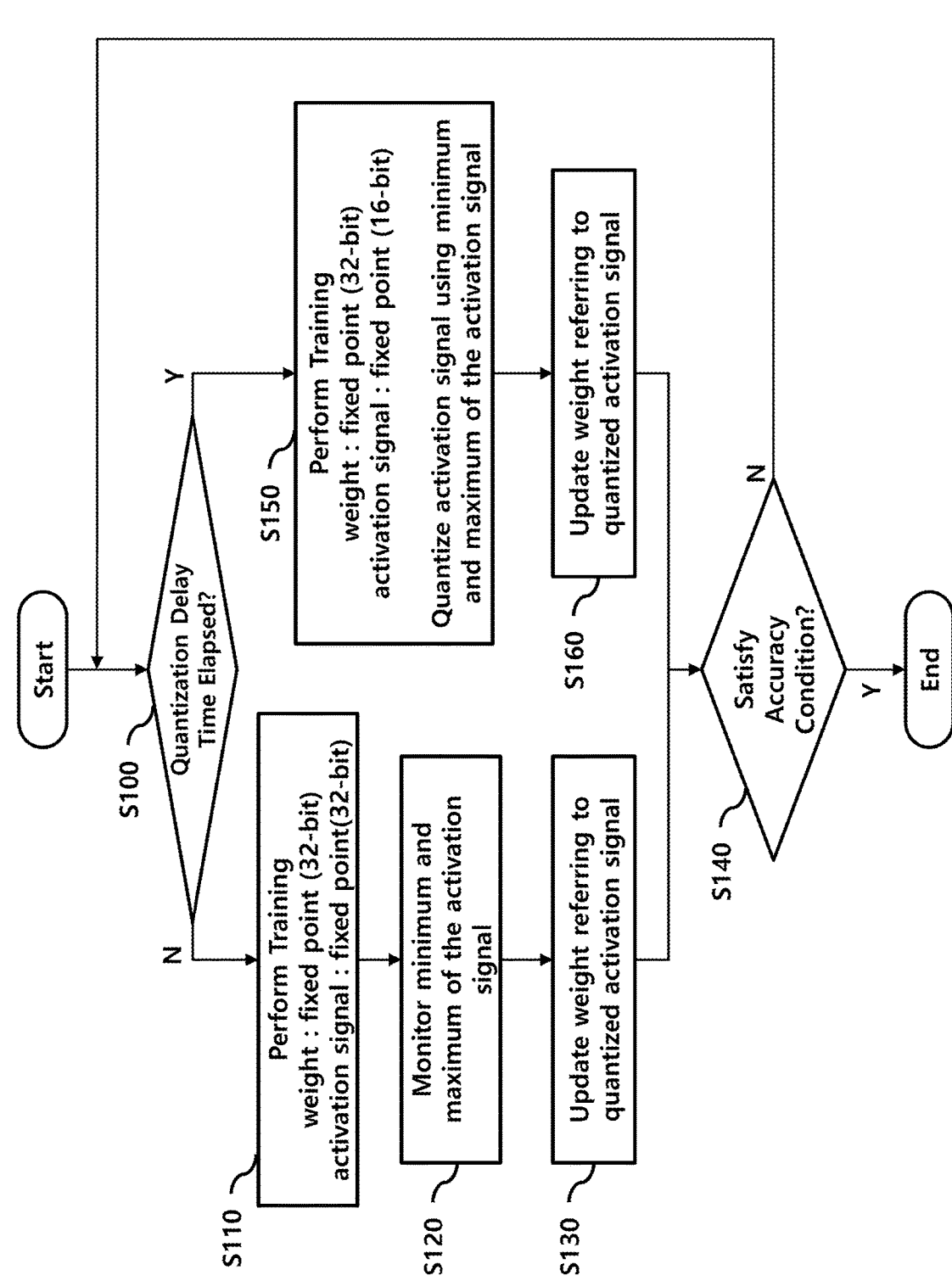

Start

S100 Quantization Delay Time Elapsed?

N

S110 Perform Training
weight : fixed point (32-bit)
activation signal : fixed point(32-bit)

S120 Monitor minimum and maximum of the activation signal

S130 Update weight referring to quantized activation signal

Y

S150 Perform Training
weight : fixed point (32-bit)
activation signal : fixed point (16-bit)

Quantize activation signal using minimum and maximum of the activation signal

S160 Update weight referring to quantized activation signal

S140 Satisfy Accuracy Condition?

N

Y

End

REINFORCEMENT LEARNING DEVICE AND OPERATION METHOD THEREOF

CROSS-REFERENCE TO RELATED APPLICATION

The present application claims priority under 35 U.S.C. § 119(a) to Korean Patent Application No. 10-2021-0079072, filed on Jun. 18, 2021, which is incorporated herein by reference in its entirety.

BACKGROUND

1. Technical Field

Various embodiments generally relate to a reinforcement learning device and an operation method thereof performing a quantization operation during a reinforcement learning operation.

2. Related Art

Reinforcement learning, a branch of artificial intelligence technology, is attracting attention by showing excellent performance in various fields such as games, robotics, industrial control systems, and autonomous vehicles.

FIG. 1 is a block diagram showing a conventional reinforcement learning device 1.

The conventional reinforcement learning device 1 receives a state signal S and a reward signal R from a host 4, and generates an action signal A on the host 4.

In reinforcement learning technology, the host 4 may also be referred to as an environment, and the reinforcement learning device 1 may also be referred to as an agent.

The conventional reinforcement learning device 1 includes an action control circuit 2 and an evaluation control circuit 3.

The action control circuit 2 determines the action signal A with reference to the state signal S provided by the host 4 and an error signal E provided by the evaluation control circuit 3.

The evaluation control circuit 3 receives the state signal S, the reward signal R, and the action signal A to generate the error signal E.

The conventional reinforcement learning device 1 performs self-learning while interacting with the host 4 in the direction of maximizing an accumulated value of the reward signal R for a predetermined time.

Each of the action control circuit 2 and the evaluation control circuit 3 may be configured to include a neural network.

Typically, inference and backward propagation operations performed during deep reinforcement learning operation require many neural network operations, and in this process, the conventional reinforcement learning device 1 consumes a lot of power.

In a conventional neural network computation technique, a quantization operation may be additionally performed to reduce an amount of computations.

However, when the conventional quantization operation is applied to the reinforcement learning device as it is, there is a problem in that accuracy is greatly reduced due to data loss that inevitably occurs in the quantization process.

SUMMARY

In accordance with an embodiment of the present disclosure, a reinforcement learning device may include a computation circuit configured to perform an operation between a weight matrix and an input activation vector and to apply an activation function on an output of the operation to generate an output activation vector, wherein the computation circuit quantizes the input activation vector when a quantization delay time has elapsed since beginning of a learning operation and does not quantize the input activation vector otherwise.

In accordance with an embodiment of the present disclosure, a reinforcement learning method may include determining whether a quantization delay time has elapsed or not; and performing a reinforcement learning operation using a weight matrix and a quantized input activation vector and updating the weight matrix with reference to the quantized input activation vector when the quantization delay time has elapsed.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and beneficial aspects of those embodiments.

FIG. 5 illustrates a reinforcement learning process according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to the presented embodiments within the scope of teachings of the present disclosure. The detailed description is not meant to limit embodiments of this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
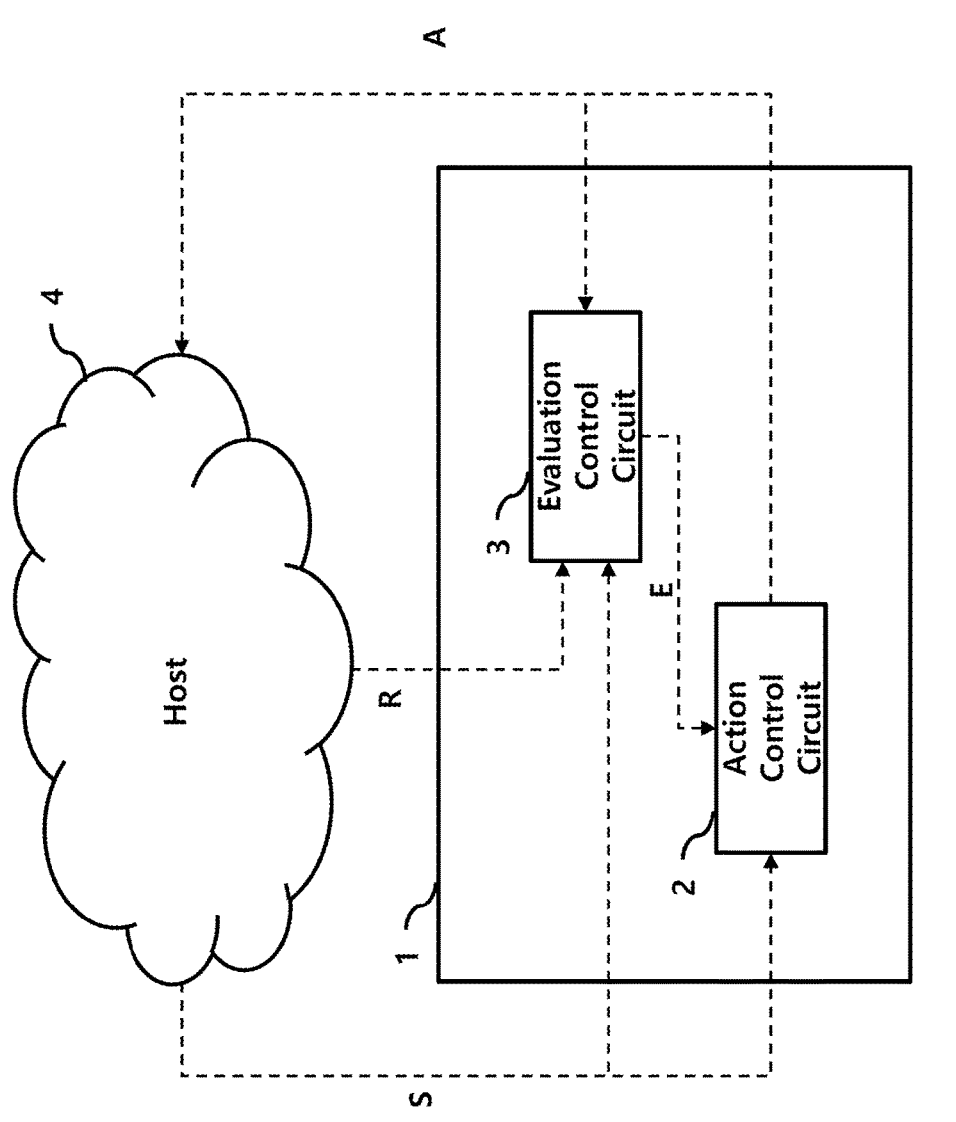
FIG. 1 illustrates a conventional reinforcement learning device.
Figure 2:
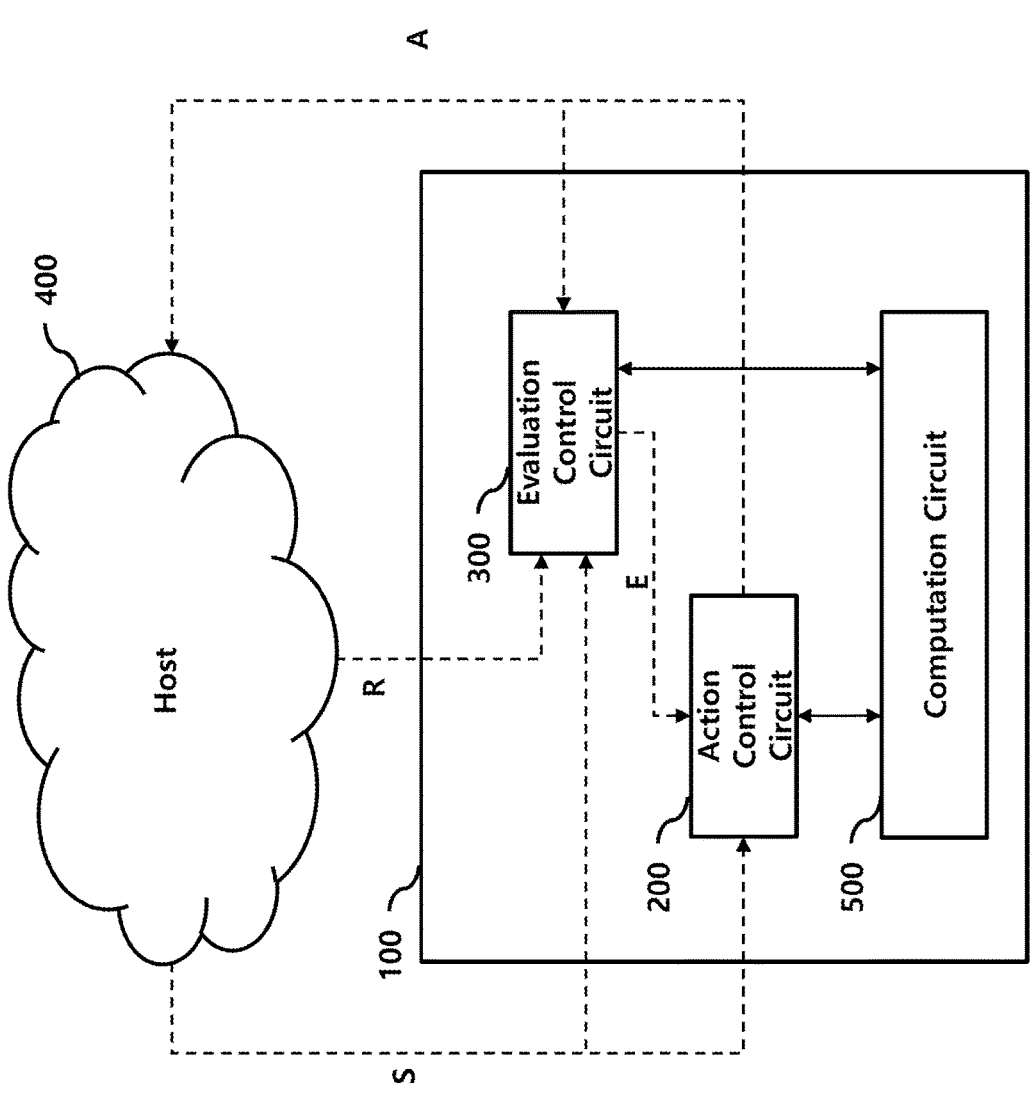
FIG. 2 illustrates a reinforcement learning device according to an embodiment of the present disclosure.

FIG. 2 is a block diagram illustrating a reinforcement learning device 100 according to an embodiment of the present disclosure.

The reinforcement learning device 100 includes an action control circuit 200, an evaluation control circuit 300, and a computation circuit 500.

The evaluation control circuit 300 evaluates meaningfulness of the action signal A based on the current state. The evaluation control circuit 300 generates an error signal E with reference to a reward signal R and a status signal S provided from a host 400 and an action signal A provided from the action control circuit 200.

The action control circuit 200 generates an action signal A with reference to the state signal S indicating a current state and the error signal E provided from the evaluation control circuit 300.

The host 400 updates the state signal S according to the action signal A and generates a reward signal R.

The action control circuit 200 and the evaluation control circuit 300 may each include a respective neural network such as a convolutional neural network (CNN).

For example, the action control circuit 200 may perform an operation using an action neural network, and the evaluation control circuit 300 may perform an operation using an evaluation neural network.

Hereinafter, the action neural network may be referred to as a first neural network, and the evaluation neural network may be referred to as a second neural network.

Data such as weights required for the action neural network and weights required for the evaluation neural network may be stored in the computation circuit 500.

The action control circuit 200 controls the computation circuit 500 to perform operations on the action neural network, and the evaluation control circuit 300 controls the computation circuit 500 to perform operations on the evaluation neural network. The operations performed on each neural network may include a forward propagation operation, a backward propagation operation, and a weight update operation.

In the field of reinforcement learning technique, the forward propagation operation, the backpropagation operation, and the weight update operation for a neural network are well known, and thus a detailed description thereof will be omitted.

The computation circuit 500 may perform various operations required for neural network operations under the control of the action control circuit 200 and the evaluation control circuit 300.

The computation circuit 500 may maintain data required for operations using the action neural network and the evaluation neural network.

A detailed configuration and operation of the computation circuit 500 will be disclosed below.

Figure 3:
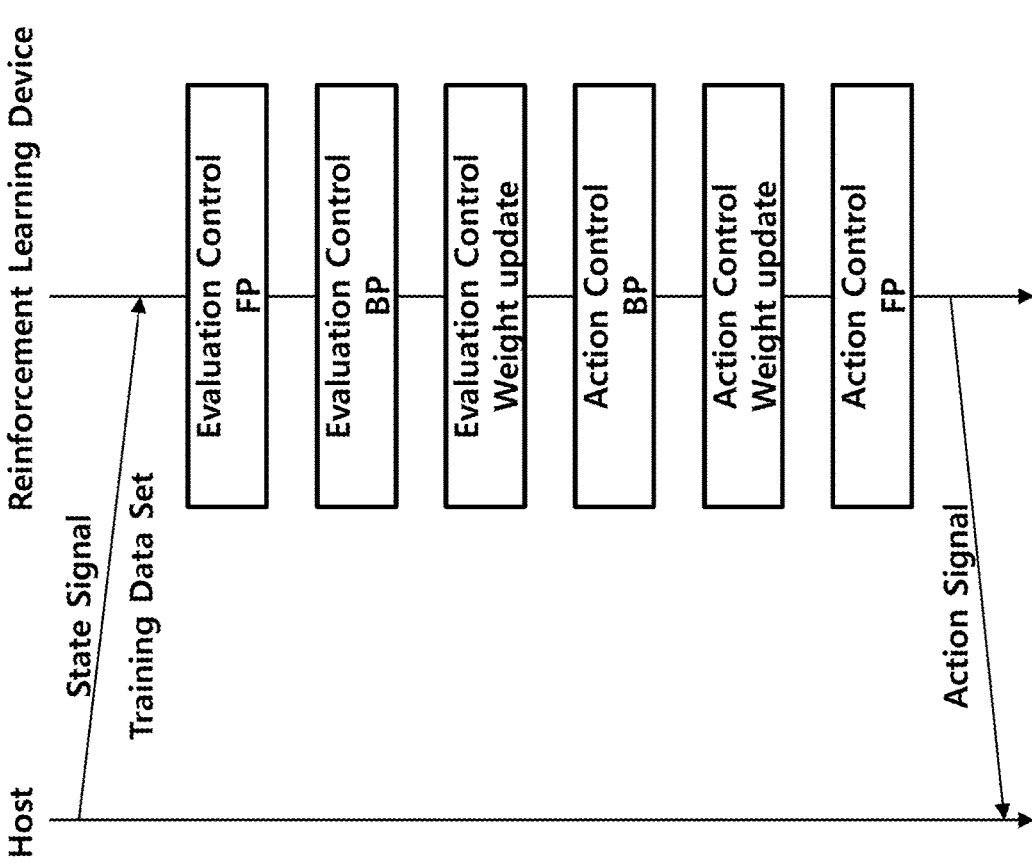
FIG. 3 illustrates an operation of a reinforcement learning device according to an embodiment of the present disclosure.

FIG. 3 is a diagram illustrating an operation of the reinforcement learning device according to an embodiment of the present disclosure.

The host 400 provides a training data set together with the state signal. The training data set may include a predetermined number (e.g., B, which is a natural number) of pairs of a state signal and a reward signal derived from previously accumulated data.

The evaluation control circuit 300 performs forward propagation FP and backward propagation BP operations B times using the B training data pairs, and then updates weights of the evaluation neural network.

The evaluation control circuit 300 generates the error signal E by applying the evaluation neural network having the updated weights to the state signal S provided from the host 400 and the current action signal A provided from the action control circuit 200.

The action control circuit 300 performs backward propagation operation B times using the error signal E provided from the evaluation control circuit 300 and the state signal S included in the training data set, and updates the weights of the action neural network.

Thereafter, the action control circuit 300 generates the action signal A by applying the action neural network having the updated weights to the state signal S and the error signal E provided from the host 400.

The generated action signal A is provided to the host 400.

Thereafter, the above-described operation may be repeated again.

Figure 4:
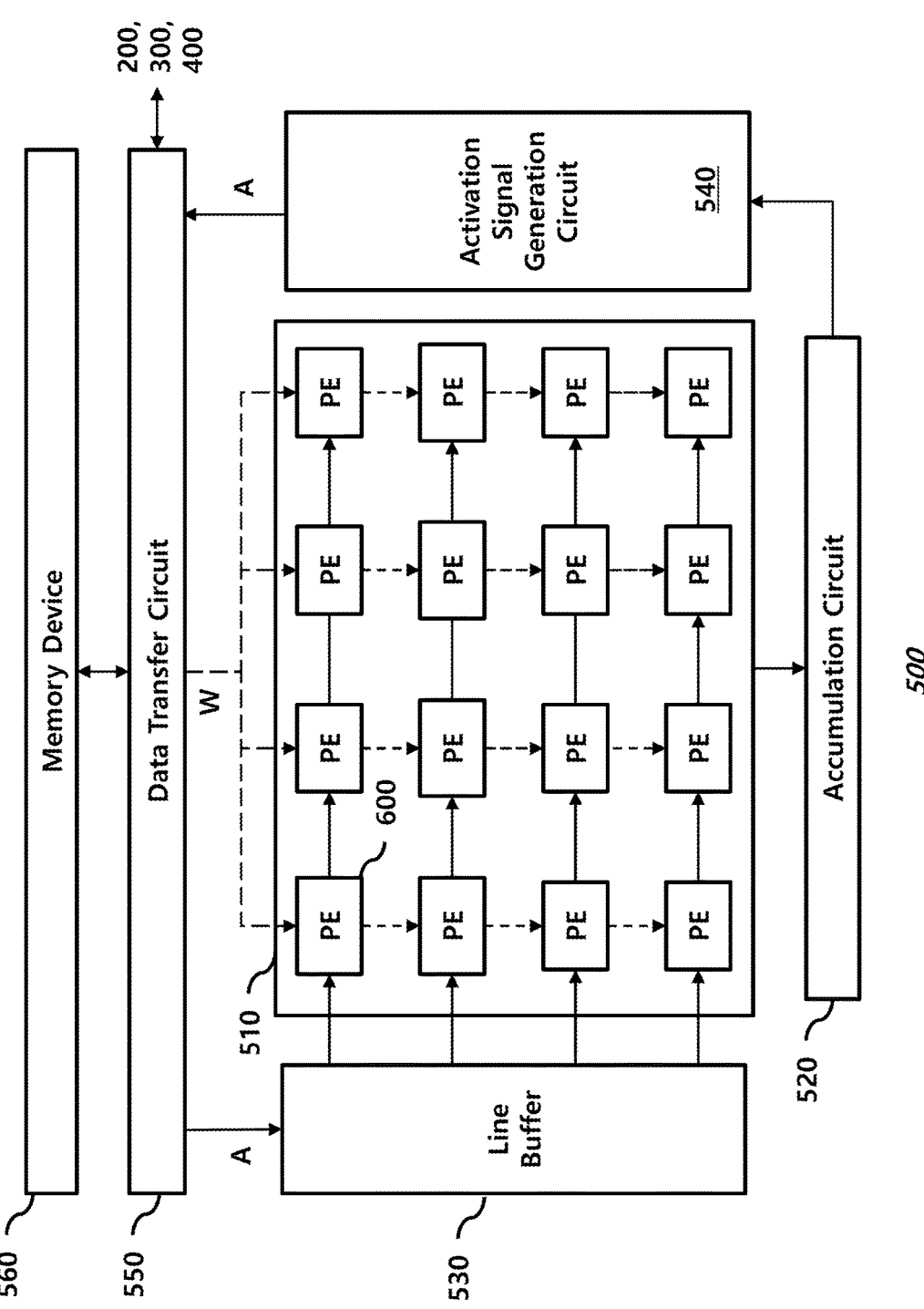
FIG. 4 illustrates an operation of a computation circuit according to an embodiment of the present disclosure.

FIG. 4 is a block diagram illustrating a computation circuit 500 according to an embodiment of the present disclosure.

The computation circuit 500 includes processing element array 510 including a plurality of processing elements PE 600 arranged in rows and columns, an accumulation circuit 520, a line buffer 530, a data transfer circuit 550, and a memory device 560.

The memory device 560 may store respective weight data of one or more neural networks (for example, an action neural network and an evaluation neural network), an input signal input to the neural networks, and an activation signal corresponding to an operation result of a previous layer.

For example, an input signal input to the action neural network may include a state signal and an error signal, and an input signal input to the evaluation neural network may include a state signal, a reward signal, and an action signal.

When a neural network includes a plurality of layers, it is well known that an operation result of one layer is transformed to an activation signal through an activation function and provided for operation of the next layer.

Hereinafter, an input signal input to the first layer of a neural network is regarded as a kind of activation signal, and a neural network operation is expressed as an operation using an activation signal and a weight signal.

In the present embodiment, the activation signal is vector data and may be referred to as activation data or an activation vector, and the weight data is matrix data and may be referred to as a weight data or a weight matrix.

The data transfer circuit 550 may transfer the weight data and the activation signal to the line buffer 530 or to the processing element array 510, and may transfer the activation signal generated by the activation signal generation circuit 540 to the memory device 560.

For example, the weight matrix W may be provided to the processing element array 510 so that each processing element 600 may be provided with a corresponding element of the weight matrix.

In addition, after the activation vector A is temporarily stored in the line buffer 530, each element of the activation vector may be commonly provided to a corresponding row of the processing element array 510.

In this case, each processing element 600 may perform a multiplication operation on a corresponding element of a weight matrix and a corresponding element of an activation vector.

The data transfer circuit 550 may perform an interface operation for transferring data between the action control circuit 200, the evaluation control circuit 300, and the host 400 of FIG. 2.

The accumulation circuit 520 may perform an accumulation operation in units of rows or columns of the processing element array 510.

For example, the accumulation circuit 520 may accumulate values output from a plurality of processing elements included in one row of the processing element array 510 or from a plurality of processing elements included in one column of the processing element array 510.

The activation signal generation circuit 540 applies an activation function to an operation result of any one layer of a neural network. Since the activation function to be applied can be selected from among those generally used in a neural network operation, a description thereof will be omitted.

In the present embodiment, an activation signal is generated by applying an activation function to an output from the accumulation circuit 520.

The activation signal output from the activation signal generation circuit 540 may be stored in the memory device 560 through the data transfer circuit 550.

The activation signal output from the activation signal generation circuit 540 is also in the form of a vector, which may be referred to as an activation vector.

Hereinafter, an activation signal or an activation vector input to the line buffer 530 is referred to as an input activation signal or an input activation vector, and the activation signal or activation vector output from the activation signal generation circuit 540 is referred to as an output activation signal or an output activation vector.

In the present embodiment, an activation signal provided to the line buffer 530 may be quantized according to whether a quantization delay time has elapsed or not.

For example, an activation signal in a 32-bit fixed-point format may be changed to a 16-bit fixed-point format through quantization.

By quantizing the activation signal in this way, the amount of computation can be reduced.

The quantization delay time is a predetermined time according to an embodiment. If the quantization delay time has elapsed since the beginning of the learning operation, the activation signal is quantized, otherwise the activation signal is not quantized.

The accuracy of neural network computation can be maintained by not performing quantization early in the computation process.

The action control circuit 200 and the evaluation control circuit 300 control the computation circuit 500 to control neural network operations necessary for reinforcement learning, such as a forward propagation operation, a backward propagation operation, and a weight update operation.

The action control circuit 200 and the evaluation control circuit 300 may determine whether a quantization delay time has elapsed while controlling a neural network operation, and may perform a quantization operation of the activation signal to be stored in the line buffer 530 according to the determination.

The processing element 600 according to an embodiment of the present disclosure is able to perform operations on both the non-quantized activation signal and the quantized activation signal.

FIG. 5 is a flowchart illustrating a reinforcement learning process according to an embodiment of the present disclosure.

The process shown in FIG. 5 can be applied to each of learning for the action neural network and learning for the evaluation neural network.

Accordingly, hereinafter, the neural network may refer to an action neural network or an evaluation neural network.

First, it is determined whether a quantization delay time has elapsed at S100.

The quantization delay time is a predetermined time and may be variously changed according to a design.

Whether the quantization delay time has elapsed is determined by comparing an elapsed time since beginning of the learning operation with the quantization delay time.

If the quantization delay time has not elapsed, the neural network is configured to use weights that include 32-bit fixed-point data, and an activation signal that includes 32-bit fixed-point data, and a learning operation is performed at S110.

The first activation signal is an input signal, which is not quantized when the quantization delay time has not elapsed, so the unquantized input signal is provided as the first activation signal.

As described above, the input signal provided to the action neural network includes a state signal and an error signal, and the input signal provided to the evaluation neural network includes a state signal, a reward signal, and an action signal.

The learning operation includes a forward propagation operation and a backward propagation operation.

While performing the learning operation, the maximum and minimum values of the activation signal are continuously monitored and stored at S120.

The activation signal is a signal output by applying an activation function to a value output from a neural network, and quantization is not performed in this case.

Thereafter, the weights of the neural network for which the learning operation is being performed are updated with reference to the activation signal at S130.

In the learning process of the evaluation neural network, the weights of the evaluation neural network are updated, and in the learning process of the action neural network, the weights of the action neural network are updated.

It is determined whether an accuracy condition is satisfied at S140.

In order to determine whether the accuracy condition is satisfied, a technique commonly used in the reinforcement learning process may be selected and applied. For example, a distance between a known true value and an actual output value from a neural network operation may be compared with a threshold value.

If the accuracy condition is satisfied, the reinforcement learning operation is terminated, otherwise the learning process returns to S100.

If it is determined that the quantization delay time has elapsed at S100, a learning operation is performed using weights including 32-bit fixed-point data and an activation signal including 16-bit fixed-point data at S150.

That is, when the quantization delay time elapses, the activation signal provided to a processing element 600 through the line buffer 530 is a quantized signal.

Before the quantization delay time elapses, the activation signal is not quantized and is used as it is, so accuracy can be maintained during a neural network operation. During this time, the minimum value $A_{min}$ and maximum value $A_{max}$ of the activation signal A are actively monitored and captured in the activation signal generation circuit 540.

After the quantization delay time has elapsed, by reducing the size of the activation signal through quantization, the amount of computation can be reduced to improve the computation speed.

When performing a quantization operation, the minimum value $A_{min}$ and maximum value $A_{max}$ of the activation signal A may be used to configure the transformation of an unquantized activation signal A into a quantized activation signal $A_q$. Quantization operation for a floating point number is known by an article ⌐ S. Krishnan, S. Chitlangia, M. Lam, Z. Wan, A. Faust, and V. J. Reddi, "Quantized reinforcement learning (quarl)," arXiv preprint arXiv: 1910.01055, 2019. ⌐ . In the present embodiment, the quantization operation is performed for a fixed point number. The activation signal generation circuit 540 may perform the quantization operation according to the Equation 1. The activation signal generation circuit 540 may perform the quantization operation according to the Equation 1.

$$A_q = \left\lfloor \frac{A}{\delta} \right\rfloor + z \qquad \text{[Equation 1]}$$

$$\text{where } \delta = \frac{A_M - A_m}{2^n}, z = \left\lfloor \frac{-A_m}{\delta} \right\rfloor, n = 16,$$

$$A_M = \max(A_{max}, 0), \text{ and } A_m = \min(A_{min}, 0)$$

Thereafter, the weights of the neural network are updated with reference to the result of the training performed using the quantized activation signal at S160.

Thereafter, it is determined whether the accuracy is satisfied at S140, and the above-described operation is repeated.

Figure 6:
FIG. 6 illustrates a processing element according to an embodiment of the present disclosure.

FIG. 6 is a block diagram illustrating a processing element 600 according to an embodiment of the present disclosure.

As described above, the number of bits used to represent an activation signal A varies depending on whether the quantization delay time has elapsed.

The processing element 600 performs an operation in response to a change in the number of bits used to represent each activation signal A by changing the data path according to whether the quantization delay time has elapsed.

In FIG. 6, when the quantization time has elapsed, the selection signal Q is activated (corresponding to Q=1 in the embodiment of FIG. 6), otherwise, the selection signal Q is deactivated (corresponding to Q=0 in the embodiment of FIG. 6).

The processing element 600 includes a first buffer 611, a second buffer 612, and a third buffer 613.

The processing element 600 further includes a first multiplier 621, a second multiplier 622, a shifter 630, a first selection circuit 641, a second selection circuit 642, a first adder 651, and a second adder 652.

The first buffer 611 stores 32-bit weight data W, and the second buffer 612 stores an activation signal A that may be a 32-bit activation signal (as A[31:0]) or two 16-bit activation signals (as A[31:16] and A[15:0], respectively).

In this case, the weight data W is one element of the weight matrix, and the activation signal A is one or two elements of the activation vector.

The third buffer 613 stores an operation result Y that may be a 32-bit operation result (as Y[31:0]) or two 16-bit operation results (as Y[31:16] and Y[15:0], respectively).

First, an operation when the selection signal Q is deactivated, that is, when the quantization delay time has not elapsed, will be described.

When the quantization delay time has not elapsed, both the weight signal and the activation signal have a data width of 32 bits.

The first multiplier 621 multiplies the upper 16 bits of the activation signal by the weight signal, and the second multiplier 622 multiplies the weight signal by the lower 16 bits of the activation signal.

The shifter 630 shifts the output of the first multiplier 621 in the upper bit direction by 16 bits and outputs the shifted output. The amount of the shift is in accordance with the formats of the representations used for the weight and activation signal values, as is well-understood in the art.

The first selection circuit 641 selects the output of the shifter 630, and the second selection circuit 642 selects the output of the second multiplier 622.

The first adder 651 adds the output of the first selection circuit 641 and the output of the second selection circuit 642, and the output of the first adder 651 corresponds to a multiplication of a 32-bit weight signal and a 32-bit activation signal.

The processing element 600 may further include a third selection circuit 643, a fourth selection circuit 644, and a fifth selection circuit 645.

The second adder 652 serves to accumulate the above multiplication result to an existing value.

The third selection circuit 643 selects the output of the first adder 651, and the fourth selection circuit 644 selects 32-bit data stored in the third buffer 613.

The second adder 652 adds the output of the third selection circuit 643 and the output of the fourth selection circuit 644.

The fifth selection circuit 645 selects and outputs the upper 16 bits among the outputs of the second adder 652.

The third buffer 613 stores the output of the fifth selection circuit 645 in the upper 16 bits, and stores the lower 16 bits among the outputs of the second adder 652 in the lower 16 bits.

That is, the third buffer 613 may accumulate the product of the weight signal and the activation signal to an existing value and store the result of the accumulation.

Through this, multiplication and accumulation operations may be performed on a plurality of pairs of weight signals and activation signals sequentially input to the processing element 600.

Next, an operation when the selection signal Q is activated, that is, when the quantization delay time has elapsed, will be described.

When the quantization delay time has elapsed, the weight signal has a data width of 32 bits, but the activation signal has a data width of 16 bits through quantization.

Accordingly, the second buffer 612 may store two 16-bit activation signals, and the processing element 600 may simultaneously perform a multiplication operation on the two activation signals.

Hereinafter, the activation signal stored in the upper 16 bits of the second buffer 612 is referred to as a first activation signal, and the activation signal stored in the lower 16 bits of the second buffer 612 is referred to as a second activation signal.

The first multiplier 621 multiplies the first activation signal and the weight signal, and the second multiplier 622 multiplies the second activation signal and the weight signal.

The first selection circuit 641 selects the output of the first multiplier 621, and the second selection circuit 642 selects the upper 16 bits of the third buffer 613.

The first adder 651 adds the output of the first selection circuit 641 and the output of the second selection circuit 642, and the output of the first adder 651 corresponds to an accumulation of the product of the weight signal and the first activation signal to an existing value.

The third selection circuit 643 selects the lower 16 bits of the third buffer 613, and the fourth selection circuit 644 selects the output of the second multiplier 622.

The second adder 652 adds the output of the third selection circuit 643 and the output of the fourth selection circuit 644, and the output of the second adder 652 corresponds to an accumulation of the product of the weight signal and the second activation signal to an existing value.

The fifth select circuit 645 selects and outputs the upper 16 bits among the outputs of the first adder 652.

The third buffer 613 stores the output of the fifth selection circuit 645 in the upper 16 bits, and stores the lower 16 bits among the outputs of the second adder 652 in the lower 16 bits.

That is, the third buffer 613 accumulates the product of the weight signal and the first activation signal in a first existing value and stores a first accumulation result in the upper 16 bits, and accumulates the product of the weight signal and the second activation signal in a second existing value and stores a second accumulation result in the lower 16 bits.

Figures 7A, 7B, 7C:
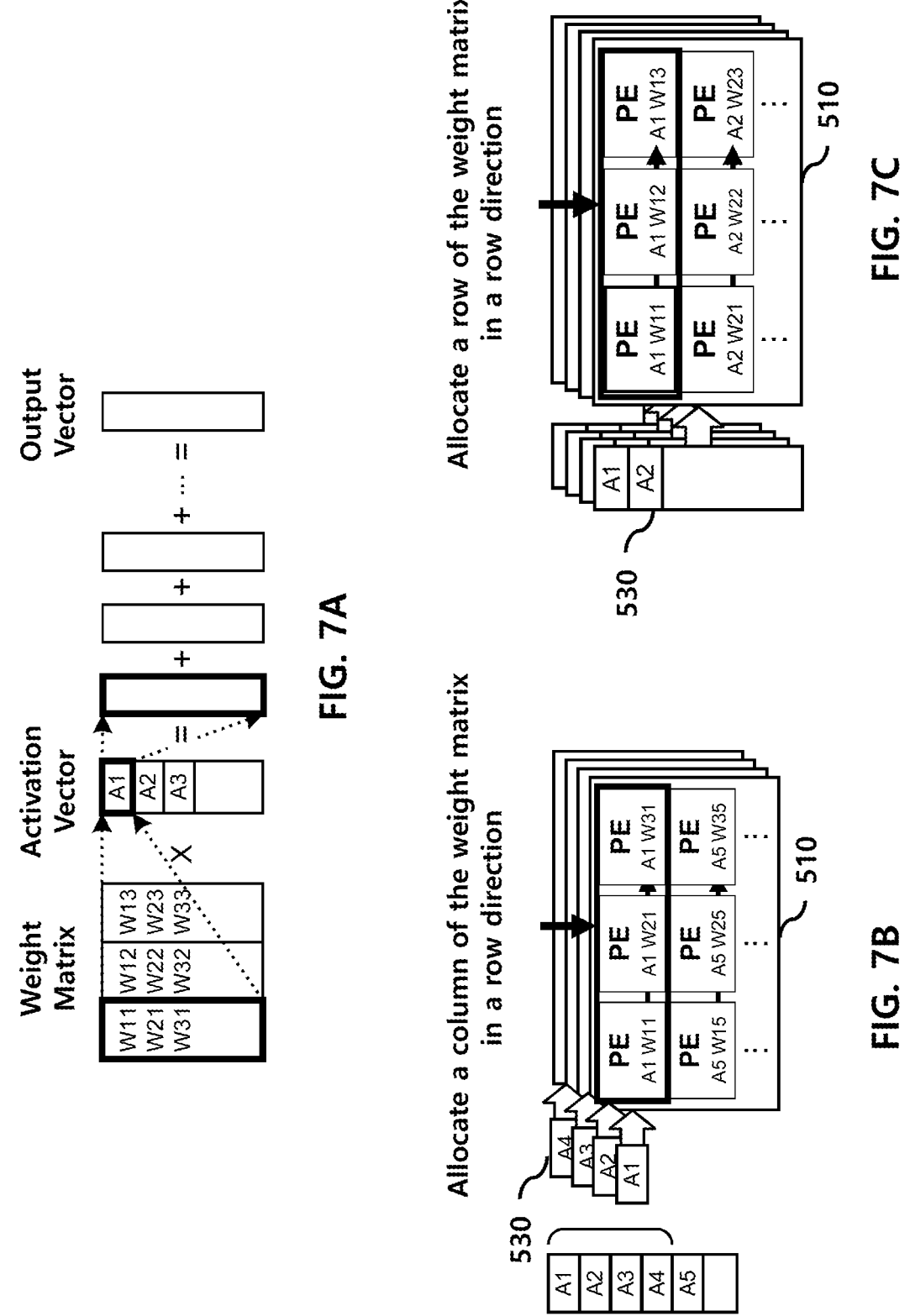
FIGS. 7A to 7C illustrate a data allocation process of a computation circuit according to an embodiment of the present disclosure.

FIGS. 7A to 7C are explanatory diagrams illustrating a data allocation process of the computation circuit 500 according to an embodiment of the present invention.

FIG. 7A illustrates a general principle of generating an output vector by multiplying a weight matrix and an activation vector.

That is, columns of the weight matrix are respectively multiplied by corresponding elements of the activation vector to generate a plurality of partial vectors corresponding to the number of elements of the activation vector, and the sum of the partial vectors becomes the final output vector.

The processing element array 510 may include a plurality of planes sharing the line buffer 530.

Four planes are shown in the figure. For example, each plane corresponds to one of four stacked layers of processing elements having the same structure.

The processing element array 510 including a plurality of planes may perform a parallel processing operation while adaptively changing a data path.

FIG. 7B shows that each column of the weight matrix is allocated in the row direction of the processing element 510.

For example, the elements of the first column of the weight matrix are sequentially assigned to the first rows of the planes, and the elements of the fifth column of the weight matrix are sequentially assigned to the second rows of the planes.

The first to fourth elements of the activation vector are sequentially allocated to the first row of each plane, and the fifth to eighth elements of the activation vector are sequentially allocated to the second row of each plane.

This has the effect of enabling parallel processing in the processing element array 510 by distributing one activation vector across multiple planes.

That is, since a parallel processing operation can be performed using a plurality of planes in order to perform an operation corresponding to one layer of the neural network corresponding to the weight matrix, this can be referred to as intra-layer parallel processing.

This type of parallel processing can be applied during an inference operation to improve the operation speed of the inference operation.

FIG. 7C shows that each row of the weight matrix is allocated in the row direction of the processing element array 510.

Data is allocated to each plane of processing element array 510 in the same manner.

The line buffer 530 allocates one activation vector to one plane and another activation vector to another plane.

This has the effect of performing calculations in parallel on the entire batch by assigning each of a plurality of activation vectors included in one batch to each plane one by one. This may be referred to as batch level parallel processing.

This type of parallel processing may be applied during the learning operation to improve the operation speed of the learning operation.

Although various embodiments have been illustrated and described, various changes and modifications may be made to the described embodiments without departing from the spirit and scope of the invention as defined by the following claims.

What is claimed is:

1. A reinforcement learning device comprising:
   a computation circuit configured to perform an operation between a weight matrix and an input activation vector and to apply an activation function on an output of the operation to generate an output activation vector,
   wherein the computation circuit quantizes the input activation vector when a quantization delay time has elapsed since beginning of a learning operation and does not quantize the input activation vector otherwise,
   wherein the computation circuit includes:
      a processing element array including a plurality of processing elements configured to perform the operation on the weight matrix and the input activation vector; and
      an activation signal generation circuit configured to apply an activation function on an operation result output from the plurality of processing elements to generate the output activation vector,
   wherein each of the plurality of processing elements includes:
      a first buffer configured to store an element of the weight matrix;
      a second buffer configured to store at least one element of the input activation vector;
      a third buffer configured to store a result of the operation;
      a first multiplier configured to multiply a data stored in the first buffer with a first data which is a part of a data stored in the second buffer;
      a second multiplier configured to multiply the data stored in the second buffer and a second data which is a part of the data stored in the second buffer and which corresponds to a lower bit data than the first data;
      a shifter configured to shift an output of the first multiplier;
      a first adder configured to add an output of the shifter and an output of the second multiplier; and
      a second adder configured to add an output of the first adder and an output of the third buffer, and
   wherein each of the plurality of processing elements further includes:
      a first selection circuit configured to provide the output of the shifter or the output of the first multiplier according to a selection signal to the first adder, the selection signal indicating whether the quantization delay time has elapsed since beginning of the learning operation;
      a second selection circuit configured to provide the output of the second multiplier or first data from the third buffer to the first adder according to the selection signal;
      a third selection circuit configured to provide the output of the first adder or second data from the third buffer to the second adder according to the selection signal;
      a fourth selection circuit configured to provide the output of the third buffer or the output of the second multiplier to the second adder according to the selection signal; and
      a fifth selection circuit configured to provide an output of the second adder or the output of the first adder to the third buffer at a location for the first data from the third buffer according to the selection signal, wherein the output of the second adder is provided to the third buffer at a location for the second data from the third buffer.

2. The reinforcement learning device of claim 1, wherein each of the first buffer, the second buffer, and the third buffer has a data width of 32 bits, each of the first data and the second data has a data width of 16 bits, and each of the at least one element of the input activation vector has a data width of 16 bits when the input activation vector is quantized.

3. The reinforcement learning device of claim 1, wherein the computation circuit includes:
a memory device storing the weight matrix;
a data transfer circuit configured to provide the weight matrix to the plurality of processing elements;
a line buffer configured to provide the input activation vector to the plurality of processing elements;
an accumulation circuit configured to accumulate outputs from the plurality of processing elements to provide an accumulation to the activation signal generation circuit.

4. The reinforcement learning device of claim 3, wherein the processing element array includes a plurality of planes, each plane including a respective plurality of the processing elements.

5. The reinforcement learning device of claim 4, wherein a plurality of elements included in the input activation vector are distributed and allocated to the plurality of planes, and a column of the weight matrix is allocated to a row of a plane of the processing element array.

6. The reinforcement learning device of claim 4, wherein the input activation vector is allocated to one of the plurality of planes, and a column of the weight matrix is allocated to a column of a plane of the processing element array.

7. The reinforcement learning device of claim 1, further comprising:
an action control circuit configured to perform a first reinforcement learning operation according to a state signal and an error signal provided from a host and to generate an action signal; and
an evaluation control circuit configured to perform a second reinforcement learning operation according to the action signal, the state signal, and a reward signal provided from the host and to generate the error signal,
wherein the action control circuit performs a first neural network operation using an action neural network by controlling the computation circuit and the evaluation control circuit performs a second neural network operation using an evaluation neural network by controlling the computation circuit.

8. The reinforcement learning device of claim 7, wherein the host provides the state signal and learning data set,
wherein the evaluation control circuit controls a first forward propagation operation for the evaluation neural network, a first backward propagation operation for the evaluation neural network, and a first weight update operation for the evaluation neural network by applying the state signal and the learning data set to the evaluation neural network; and
wherein the action control circuit controls a second forward propagation operation for the action neural network, a second backward propagation operation for the action neural network, and a second weight update operation for the action neural network by applying the state signal and the learning data set to the action neural network and to generate the action signal.

9. The reinforcement learning device of claim 8, wherein the evaluation control circuit controls quantization operation of a first input activation vector during the first reinforcement learning operation using the evaluation neural network according to an elapse of the quantization delay time, and the action control circuit controls quantization operation of a second input activation vector during the second reinforcement learning operation using the action neural network according to an elapse of the quantization delay time.

* * * * *